(12) United States Patent
Holden

(10) Patent No.: US 6,798,159 B1
(45) Date of Patent: Sep. 28, 2004

(54) VSD CONTROL

(75) Inventor: Steven J. Holden, Manlius, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/413,011

(22) Filed: Apr. 14, 2003

(51) Int. Cl.$^7$ .................................................. H02P 1/00
(52) U.S. Cl. .................... 318/268; 318/729; 318/66; 62/196.4; 62/228.4; 62/228.5; 323/205
(58) Field of Search .................... 318/268, 66, 729; 62/196.4, 228.4, 228.5; 323/205

(56) References Cited

U.S. PATENT DOCUMENTS

| | | | | |
|---|---|---|---|---|
| 4,723,104 A | * | 2/1988 | Rohatyn | ..................... 318/813 |
| 5,321,308 A | * | 6/1994 | Johncock | ................... 290/40 C |
| 5,797,729 A | * | 8/1998 | Rafuse et al. | ................... 417/3 |
| 6,014,325 A | * | 1/2000 | Pecore | ........................ 363/126 |
| 6,407,530 B1 | * | 6/2002 | Kwon et al. | ................. 318/778 |
| 6,411,065 B1 | * | 6/2002 | Underwood et al. | .......... 322/20 |
| 6,579,067 B1 | * | 6/2003 | Holden | ........................... 417/2 |

* cited by examiner

*Primary Examiner*—Rina Duda
(74) *Attorney, Agent, or Firm*—Bachman & LaPointe, P.C.

(57) ABSTRACT

A variable speed drive control system operates a variable speed drive to power a first load from a power source simultaneously powering a second load. An AC reactive power is monitored which may comprise or consist of an AC reactive power of the second load. Responsive to the monitored AC reactive power, the variable speed drive is controlled to counter the AC reactive power of the second load.

9 Claims, 1 Drawing Sheet

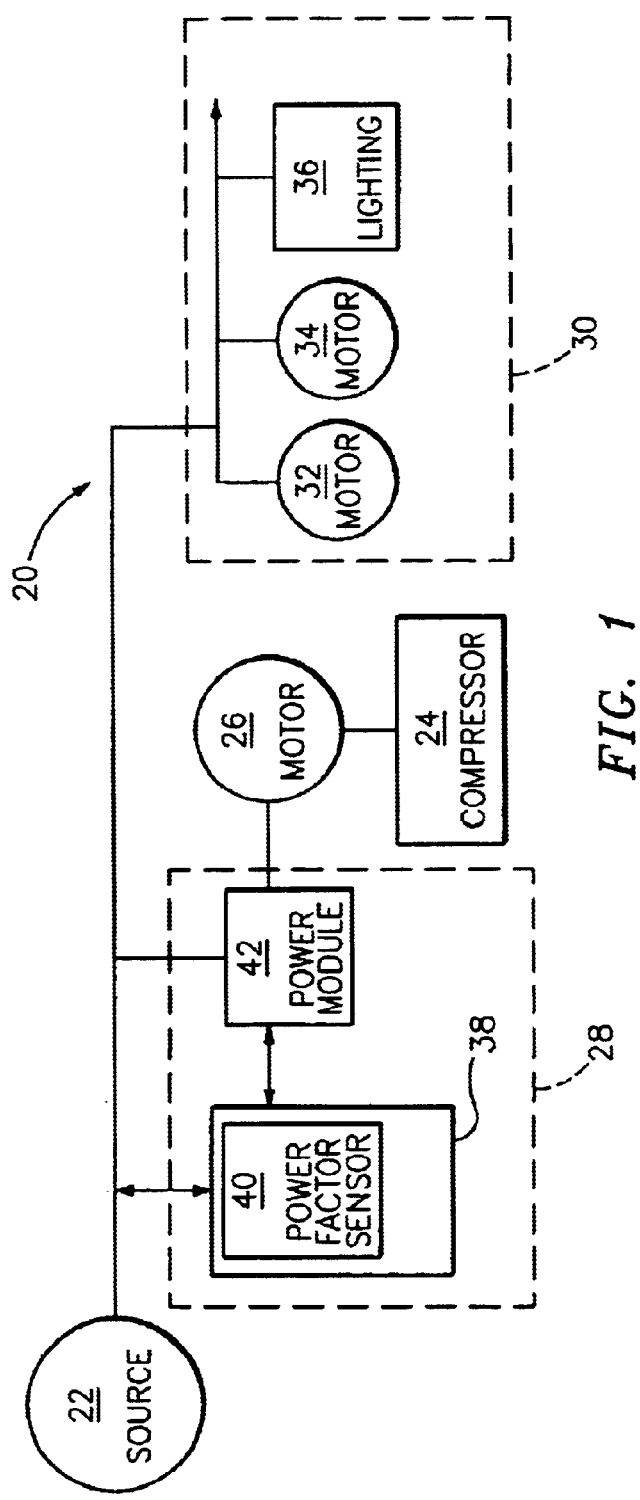
FIG. 1
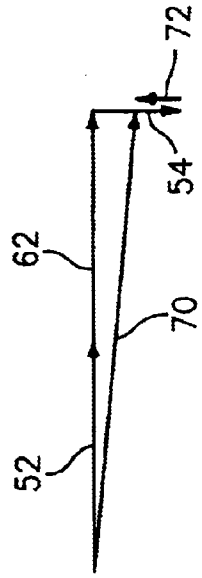
FIG. 4
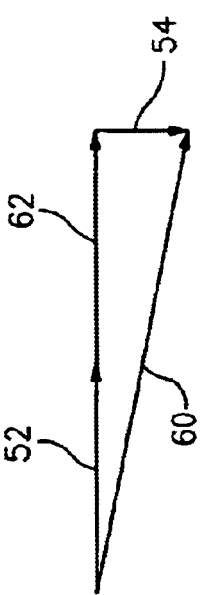
FIG. 3
(PRIOR ART)
FIG. 2

US 6,798,159 B1

VSD CONTROL

BACKGROUND OF THE INVENTION (1) Field of the Invention

This invention relates to variable speed drives, and more particularly to variable speed drives controlling compressor motors.

(2) Description of the Related Art

Variable speed drives (VSDs) are commonly used to power electric motors of compressors. An exemplary application is refrigeration compressors used to cool water for building climate control, industrial cooling or the like. The electricity consumption of such VSDs may represent a substantial portion of the energy consumption of the building.

It is known to control the VSD (e.g., a VSD having an active rectifier front end) to compensate for losses associated with the reactive power of the motor being powered. The reactive power (measured in volt ampere reactive or VAR) is energy used by the motor to build up its magnetic field. VARs are not converted into work and thus represent losses. The VSD may be controlled to ideally zero the reactive power of the combined VSD and motor system. So controlled, the ratio of real power to apparent power of the system (the "power factor") will be one.

The apparent power (measured in volt ampere or VA) is the mathematical product of voltage and current in an AC system. Because voltage and current may not be in phase in an AC system, the apparent power may exceed the real power. Reactive loads (inductance and/or capacitance) in an AC system will cause the apparent power to exceed the real power. Apparent power may be graphically represented in vector form as the hypotenuse of a right triangle whose other sides are real power and reactive power.

BRIEF SUMMARY OF THE INVENTION

Accordingly, certain aspects of the invention relate to the operation of a VSD to power a first load. The VSD is powered by a power source simultaneously powering a second load. An AC reactive power is monitored which may comprise a second AC reactive power of the second load. Responsive to the monitored reactive power, the VSD is controlled to maintain a first AC reactive power of the VSD and first load opposite the second AC reactive power.

In various implementations, the magnitude of the first AC reactive power may be maintained to at least 20% of a magnitude of the second AC reactive power. The magnitude of the first AC reactive power may be maintained to at least the lesser of: 50% of the magnitude of the second AC reactive power; and 20% of a real power of the variable speed drive.

Other aspects of the invention are directed to a VSD system having means for monitoring the monitored AC reactive power and means for controlling the VSD responsive to the monitored AC reactive power.

The controlling may maintain a combination of the AC reactive power of the variable speed drive and compressor motor and the AC reactive power of the additional load to no more than 50% of a wattage of the combination.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 is a schematic diagram of a building electrical system including a VSD-driven load and an additional load.

FIG. 2 is a power triangle of an additional load.

FIG. 3 is a system power triangle according to the prior art.

FIG. 4 is a system power triangle according to principles of the invention.

Like reference numbers and designations in the various drawings indicate like elements.

DETAILED DESCRIPTION

FIG. 1 shows a building power system 20 including an AC power source 22 (e.g., a generator output or utility output). The building has a refrigeration compressor 24 mechanically driven by an electric motor (e.g., a three-phase AC motor 26). The motor is, in turn, electrically powered by a VSD 28 drawing input power from the source 22. Beyond the load of the compressor/motor/VSD, the source 22 powers an additional load 30 which may include various individual loads such as industrial motors 32 and 34, lighting 36 and additional building systems and contents (not shown). The VSD receives input from a controller 38 coupled to the source 22 and which includes a power factor sensor 40 to measure the reactive power of the system (e.g., all loads powered by the source 22) either directly or indirectly. The VSD includes a power module 42 coupled to the source 22 to receive power therefrom and to the motor 26 to supply power thereto. The power module is also coupled to the controller 38 so that the controller may control delivery of power by the power module.

FIG. 2 shows a power triangle for the additional load 30. An apparent power 50 is shown as the hypotenuse of a triangle whose remaining sides are a real power 52 and a reactive power 54. If, as in the prior art (FIG. 3), the VSD 28 is operated to zero the reactive power of its combination with the motor 26, a system apparent power 60 will be the hypotenuse of a triangle whose first side is the combination of additional load real power 52 and VSD/motor real power 62 and whose second side is merely the additional load reactive power 54. According to the present invention, depending upon the size and other properties of the loads in question, the VSD may be operated to maintain a reactive power of the VSD/motor combination to fully or partially cancel the reactive power of the additional loads. FIG. 4 shows the apparent power 70 in such a partial cancellation. The first side of the triangle remains the combination of the real powers 52 and 62. The second side is the additional load reactive power 54 reduced by the oppositely-directed reactive power 72 of the VSD/motor combination or subsystem. Thus the system power factor may be brought closer to one than in the system of FIG. 3.

An exemplary power factor sensor does not directly measure the power factor but, rather, includes components measuring other parameters from which the power factor is computed. Existing VSD drives may include such components for measuring such parameters in order to control the active rectifier power module to minimize the reflection of harmonic distortion onto the input power.

In an exemplary implementation, the additional load 30 is dominated by induction motors powered directly from the source 22. Such motors have an exemplary power factor of 0.8–0.9 with current lagging voltage. It would be advantageous to raise the system power factor to at least 0.9, preferably to at least 0.95. With such inductive additional load the VSD may be controlled to appear more capacitive as illustrated. Alternatively, if the additional load is capacative in nature the VSD may be controlled to appear more inductive (not illustrated).

One or more embodiments of the present invention have been described. Nevertheless, it will be understood that various modifications may be made without departing from the spirit and scope of the invention. For example, although a basic system has been shown, the principles may be applied to more complex systems. Details of the particular application and underlying VSD technology may influence details of any associated implementation. Although monitoring of the system reactive power is identified, monitoring of just the additional load reactive power is also possible. Accordingly, other embodiments are within the scope of the following claims.

What is claimed is:

1. A method for operating a variable speed drive to power a first load from a power source simultaneously powering a second load, the method comprising:
   monitoring a monitored AC reactive power comprising a second AC reactive power of the second load; and
   responsive to the monitored AC reactive power, controlling the variable speed drive to maintain a first AC reactive power of the variable speed drive and first load opposite the second AC reactive power.

2. The method of claim 1 wherein said controlling comprises maintaining a magnitude of the first AC reactive power of the to at least 20% of a magnitude of the second AC reactive power.

3. The method of claim 1 wherein said controlling comprises maintaining a magnitude of the first AC reactive power to at least the lesser of:
   50% of a magnitude of the second AC reactive power; and
   20% of a real power of the variable speed drive.

4. A method for operating a variable speed drive to power a compressor motor from a power source simultaneously powering an additional load including at least one additional motor, the method comprising:
   monitoring a monitored AC reactive power including an AC reactive power of the additional load; and
   responsive to the monitored AC reactive power, controlling the variable speed drive to maintain an AC reactive power of the variable speed drive and compressor motor opposite the AC reactive power of the additional load.

5. The method of claim 4 wherein the controlling maintains a combination of the AC reactive power of the variable speed drive and compressor motor and the AC reactive power of the additional load to no more than 50% of a wattage of the combination.

6. A variable speed drive system for powering a first load from a source also powering a second load, the system comprising:
   means for monitoring a monitored AC reactive power comprising an AC reactive power of the second load; and
   means for controlling the variable speed drive responsive to the monitored AC reactive power to maintain an AC reactive power of the variable speed drive and first load opposite the AC reactive power of the second load.

7. The system of claim 6 in combination with the first load, the first load being a motor of a compressor.

8. The combination of claim 7 in further combination with the second load, the second load comprising at least one additional motor not powered by the variable speed drive.

9. The combination of claim 7 in further combination with the second load, the second load being remaining group of loads of a building.

* * * * *